United States Patent
Klinetob et al.

(10) Patent No.: US 8,376,712 B2
(45) Date of Patent: Feb. 19, 2013

(54) FAN AIRFOIL SHEATH

(75) Inventors: Carl Brian Klinetob, East Haddam, CT (US); Phillip Alexander, Colchester, CT (US); Allan J. Brockett, South Glastonbury, CT (US)

(73) Assignee: United Technologies Corporation, Hartford, CT (US)

( * ) Notice: Subject to any disclaimer, the term of this patent is extended or adjusted under 35 U.S.C. 154(b) by 463 days.

(21) Appl. No.: 12/693,949

(22) Filed: Jan. 26, 2010

(65) Prior Publication Data

US 2011/0182740 A1 Jul. 28, 2011

(51) Int. Cl.
*B64C 11/20* (2006.01)
(52) U.S. Cl. ........................................ 416/224
(58) Field of Classification Search .............. 416/62, 416/224
See application file for complete search history.

(56) References Cited

U.S. PATENT DOCUMENTS

| | | | |
|---|---|---|---|
| 1,793,775 A * | 2/1931 | Charavay | 416/224 |
| 4,006,999 A | 2/1977 | Brantley et al. | |
| 4,010,530 A | 3/1977 | Delgrosso et al. | |
| 4,795,313 A | 1/1989 | Coulon | |
| 5,261,796 A | 11/1993 | Niemiec et al. | |
| 5,449,273 A | 9/1995 | Hertel et al. | |
| 5,881,972 A | 3/1999 | Smith et al. | |
| 6,132,857 A * | 10/2000 | Champenois et al. | 428/300.7 |
| 6,341,747 B1 | 1/2002 | Schmidt et al. | |
| 6,413,051 B1 | 7/2002 | Chou et al. | |
| 6,607,358 B2 | 8/2003 | Finn et al. | |
| 7,581,933 B2 | 9/2009 | Bruce et al. | |
| 2008/0159868 A1* | 7/2008 | Kray et al. | 416/223 R |

* cited by examiner

*Primary Examiner* — Dwayne J White
(74) *Attorney, Agent, or Firm* — Kinney & Lange, P.A.

(57) ABSTRACT

A sheath for a fan airfoil having a leading edge, a trailing edge, a tip, a root, a suction side and a pressure side includes a solid portion to wrap around the airfoil lead edge and over the airfoil tip and means for securing the solid portion to the airfoil.

20 Claims, 3 Drawing Sheets

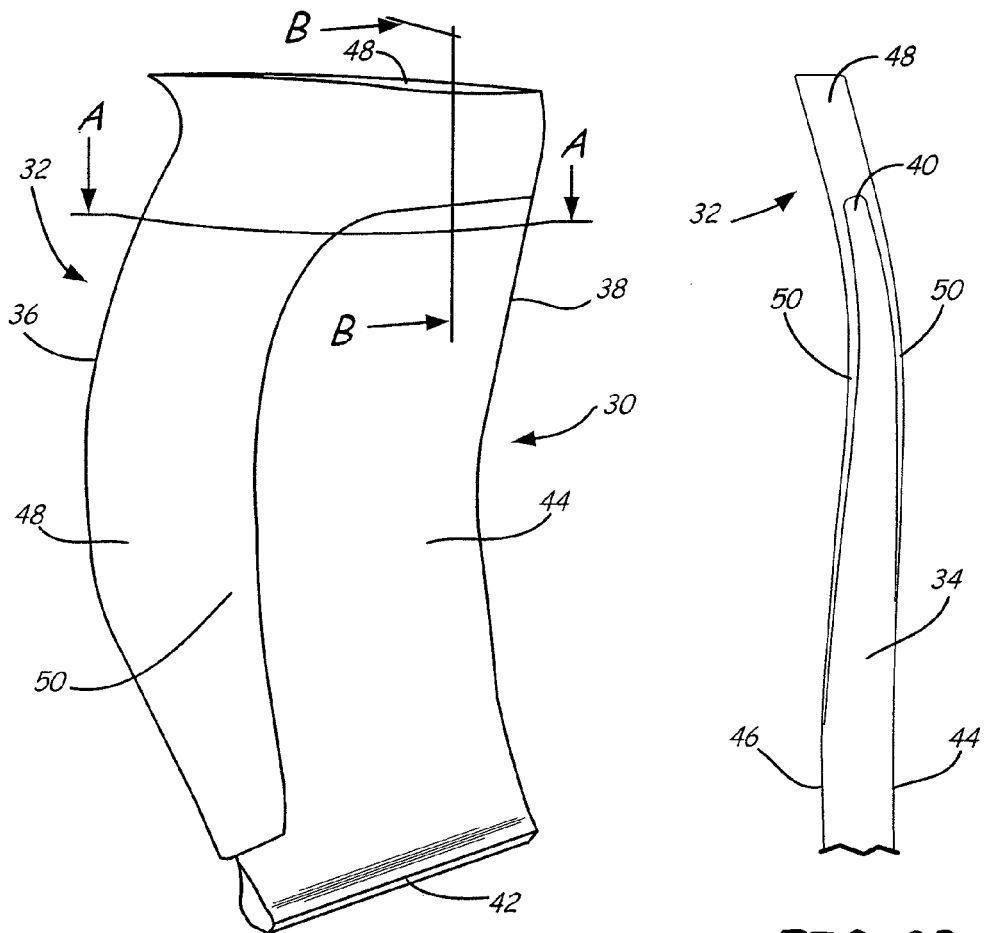
*FIG. 2*
*FIG. 2B*
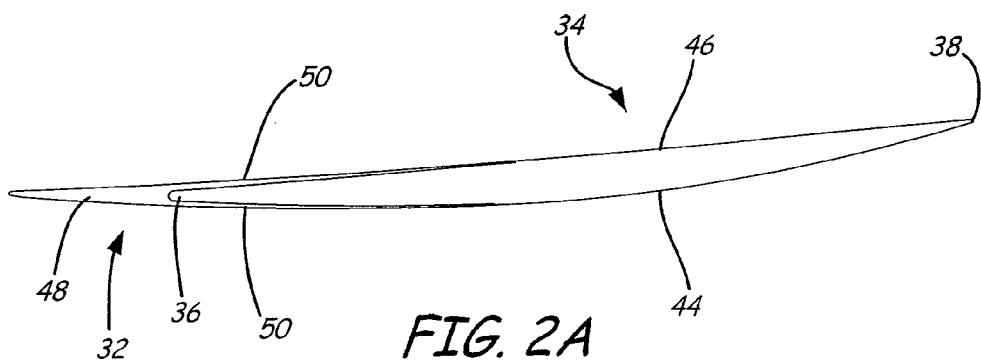
*FIG. 2A*

FAN AIRFOIL SHEATH

BACKGROUND

Composite materials offer potential design improvements in gas turbine engines. For example, in recent years composite materials have been replacing metals in gas turbine engine fan blades because of their high strength and low weight. Most legacy gas turbine engine fan blades are titanium with a thin cross-section. The ductility of titanium fan blades enables the fan to ingest a bird and remain operable or be safely shut down. The thin cross-section allows high levels of aerodynamic efficiency. The same requirements are present for composite fan blades.

A composite airfoil has a root, which connects to the fan mechanism, and a tip opposite the root. A composite airfoil for a turbine engine fan blade is typically designed with a divergent root portion known as a dovetail root. The thickness of the airfoil greatly changes over the length from the tip to the root. This is due to various strength and stiffness requirements in various locations of the airfoil to optimize the performance of the airfoil under various conditions, including a bird strike.

Traditionally the composite fan blade is a two-dimensional laminate fan blade made of many layers of composite material. A composite fan blade can also be made of a three-dimensionally woven preform. Often a sheath is placed over the leading edge of the blade to protect the blade against erosion and damage from the strike of a foreign object, such as a bird.

SUMMARY

A sheath for a fan airfoil having a leading edge, a trailing edge, a tip, a root, a suction side and a pressure side includes a solid portion to wrap around the airfoil lead edge and over the airfoil tip and means for securing the solid portion to the airfoil.

A method of fabricating a fan airfoil with a sheath includes fabricating the airfoil with a leading edge, a trailing edge, a tip, a root, a suction side and a pressure side; forming a sheath with a solid portion and a first flank and a second flank attached to the solid portion; and securing the sheath to the airfoil so that the solid portion covers the leading edge and tip of the airfoil.

BRIEF DESCRIPTION OF THE DRAWINGS

FIG. 2 is a perspective view of a composite blade with sheath according to the present invention.

FIG. 2A is a cross-sectional view of the composite blade with sheath of FIG. 2 from line A-A.

FIG. 2B is a cross-sectional view of the composite blade with sheath of FIG. 2 from line B-B.

DETAILED DESCRIPTION

Figure 1:
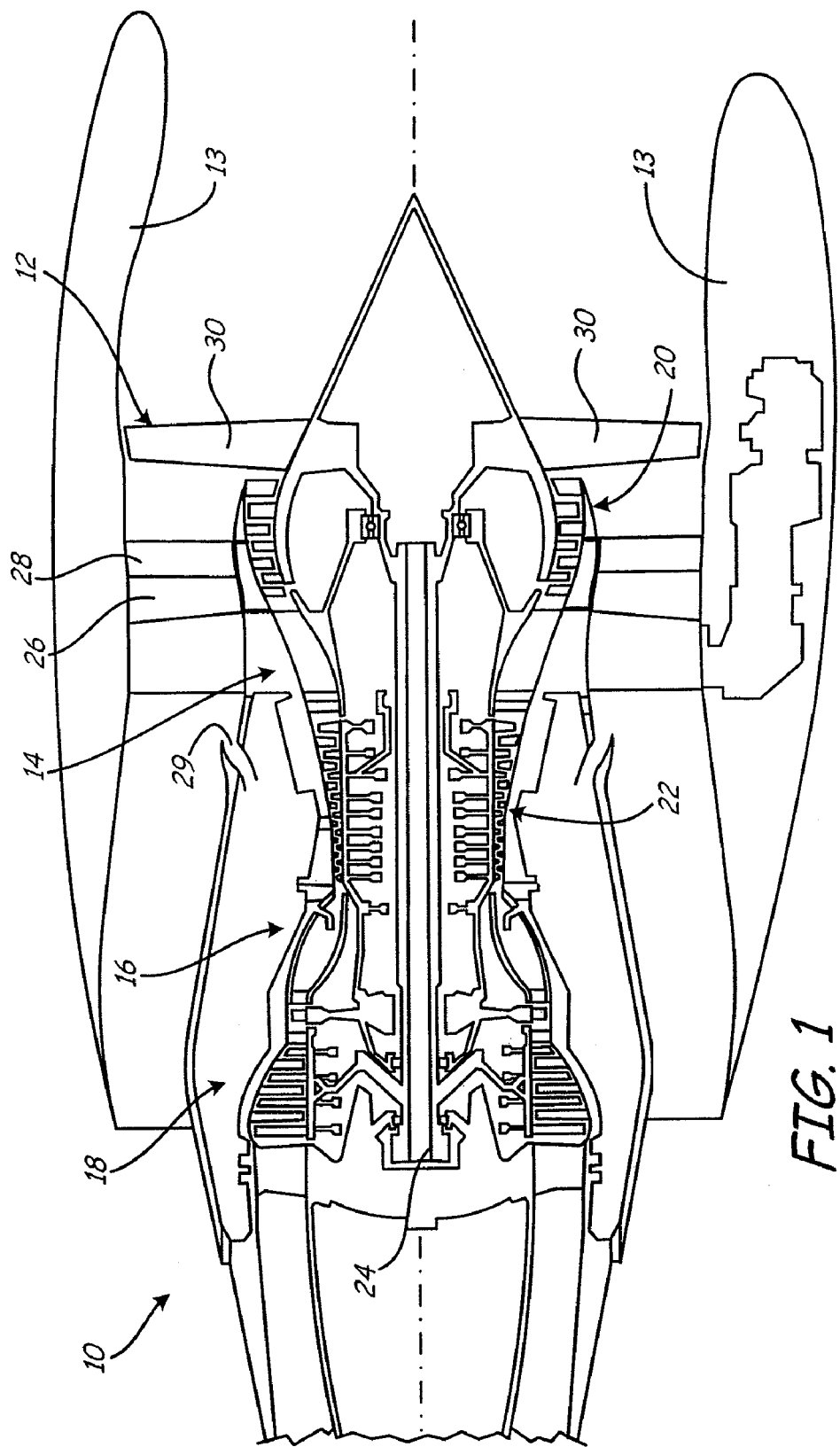
FIG. 1 is a cross-sectional view of a gas turbine engine.

FIG. 1 is a cross-sectional view of gas turbine engine 10, which includes turbofan 12, fan case 13, compressor section 14, combustion section 16 and turbine section 18. Compressor section 14 includes low-pressure compressor 20 and high-pressure compressor 22. Air is taken in through fan 12 as fan 12 spins in fan case 13. A portion of the inlet air is directed to compressor section 14 where it is compressed by a series of rotating blades and vanes. The compressed air is mixed with fuel, and then ignited in combustor section 16. The combustion exhaust is directed to turbine section 18. Blades and vanes in turbine section 18 extract kinetic energy from the exhaust to turn shaft 24 and provide power output for engine 10.

The portion of inlet air which is taken in through fan 12 and not directed through compressor section 14 is bypass air. Bypass air is directed through bypass duct 26 by guide vanes 28. Some of the bypass air flows through opening 29 to cool combustor section 16, high pressure compressor 22 and turbine section 18. Fan 12 includes a plurality of composite blades 30 which spin in fan case 13.

FIG. 2 illustrates composite blade 30 with sheath 32. FIG. 2A illustrates a cross-sectional view of composite blade 30 with sheath 32 taken along line A-A in FIG. 2. FIG. 2B illustrates a cross-sectional view of composite blade 30 with sheath 32 taken along line B-B in FIG. 2.

Composite blade 30 includes airfoil 34 with leading edge 36, trailing edge 38, tip 40, root 42, suction side 44 and pressure side 46. Sheath 32 includes solid portion 48 covering leading edge 36 and tip 40, and tapered flanks 50 extending from each side of solid portion 48. The cross-sectional view of composite blade 30 with sheath 32 in FIG. 2A includes sheath solid portion 48 with tapered flanks 50, and composite airfoil 34 with leading edge 36, trailing edge 38, suction side 44 and pressure side 46. Cross-sectional view of composite blade 30 with sheath 32 in FIG. 2B includes solid portion 48 and tapered flanks 50 of sheath 32, and composite airfoil 34 with tip 40, suction side 44 and pressure side 46.

Sheath 32 covers leading edge 36 and tip 40 of airfoil 34 with solid portion 48 by bonding tapered flanks 50 to suction side 44 and pressure side 46 of airfoil 34. Tapered flanks 50 can be bonded to suction side 44 and pressure side 46 with various adhesives including, but not limited to, rubber, silicone or epoxy resin. Sheath 32 can be made of titanium which has sufficient stiffness and strength to withstand an impact load, such as a bird strike. Solid portion 48 of sheath 32 can vary in thickness to ensure that it covers the entire thickness (from suction side 44 to pressure side 46) of leading edge 36 and tip 40 of airfoil 34. The distance which solid portion 48 of sheath 32 extends out from leading edge 36 (see FIG. 2A) can vary across the span (from root 42 to tip 40) of sheath 32, and can be about 5% to about 6% of the length of the chord (the length from leading edge 36 to trailing edge 38 of airfoil 34) to about 20% of the length of the chord of airfoil 34. Solid portion 48 covering tip 40 (see FIG. 2B) can extend about 0.5 inches (12.7 mm) above tip 40, but may vary to ensure a smooth transition from solid portion 48 covering leading edge 36 to solid portion 48 covering tip 40. The length of solid portion 48 (extending out from leading edge 36 and from tip 40) can vary widely, but must be sufficiently long to provide protection for leading edge 36 and tip 40 of blade 30. The length of tapered flanks 50 (which bond to suction side 44 and pressure side 46 of airfoil 34) can be about 2 inches (50.8 mm) to about 5 inches (127 mm), but may vary depending on requirements of blade 30 and sheath 32. The maximum thickness of each flank 50 can vary considerably depending on the length of solid portion 48 of sheath 32, but can be about 0.03 inches (0.762 mm) to about 1 inch (25.4 mm). The lengths and percentages for the dimensions of sheath 32 are given for example purposes, and can vary depending on requirements for blade 30, sheath 32 and engine 12.

Sheath 32 provides extra strength and stiffness to blade 30, allowing blade 30 to be made of lightweight materials, and still maintain optimal performance and levels of aerodynamic efficiency under impact loading similar to the levels of prior art metal blades. Solid portion 48 of sheath 32 provides a layer of protection for tip 40 and leading edge 36 of airfoil. Tapered flanks 50 bond solid portion 48 to airfoil to hold solid portion 48 in place. Tapered flanks 50 further provide extra stiffness to airfoil 48 and more surface area for a smooth load transfer during impacts to blade 30.

When subject to impact loading, a blade is subject to cracking, delamination (if the blade is a composite laminate blade) and deformation. A blade with a sheath is also subject to delamination of the sheath material from the substructure under impact loading. This is especially true for composite blades, as they are usually made from laminates or woven out of lightweight materials. Composite blades (and other lightweight blades) are especially subject to deformations, cracking and delamination during impact loading due to reduced stiffness and strain capability of light-weight composite materials as compared to legacy titanium airfoils (which are much stiffer but much heavier).

This cracking or delamination from an impact loading is usually initiated at tip 40 or leading edge 36 of airfoil 34. This initiation of cracking or delamination at tip 40 or at leading edge 36 is also due to the tip (and sometimes the leading edge) of prior art blades not being covered with a protective sheath. The cracking and delamination can then spread to other sections of the blade, potentially resulting in catastrophic failure of the blade. Sheath 32 provides significant stiffness improvements to composite blade 30, protecting areas where most failures through delamination or cracking are initiated (leading edge 36 and tip 40) with solid portion 48. Solid portion 48 provides stiffness and strength to protect areas where most blade failures are initiated, allowing airfoil 34 to be made of light-weight materials and still maintain optimal performance, even under impact loading. Tapered flanks 50 bond to suction side 44 and pressure side 46 of airfoil 34 to hold solid portion 48 in place. Tapered flanks 50 also provide extra stiffness to blade 30 and help ensure a smooth transfer of impact loads to blade 30. The tapering of flanks 50 helps to reduce stress discontinuities, therefore reducing the likelihood that flanks 50 will peel away from blade 30. Sheath 32 further provides extra protection for tip 40 of blade 30 in situations where blade 30 is designed to rub against fan case 13 (see FIG. 1) to minimize the clearance between tip 40 of blade 30 and fan case 13 for aerodynamic efficiency.

Sheath 32 (by providing this extra protection to sections of blade most vulnerable to cracking and deformation from impact loading) also allows blade 30 to maintain a thin cross-section (and thereby maintain levels of aerodynamic efficiency similar to legacy titanium blades) despite using light weight materials in composite blade 30. To protect against cracking and delamination failures, the thickness in some prior art composite (or generally light-weight) blades was increased. This additional thickness resulted in a reduction in local strain under impact loading, making the blade more resistant to cracking and delamination failures. However, this additional thickness also resulted in significant aerodynamic efficiency penalties. The current invention allows for a lightweight blade to maintain a thin cross-section (and therefore be able to maintain aerodynamic efficiency) and resist cracking and delamination failures by providing sheath 32 extending across leading edge 36 of blade 30 and over the outer diameter of tip 40 (all places where cracking or delamination is likely to be initiated).

Figure 3:
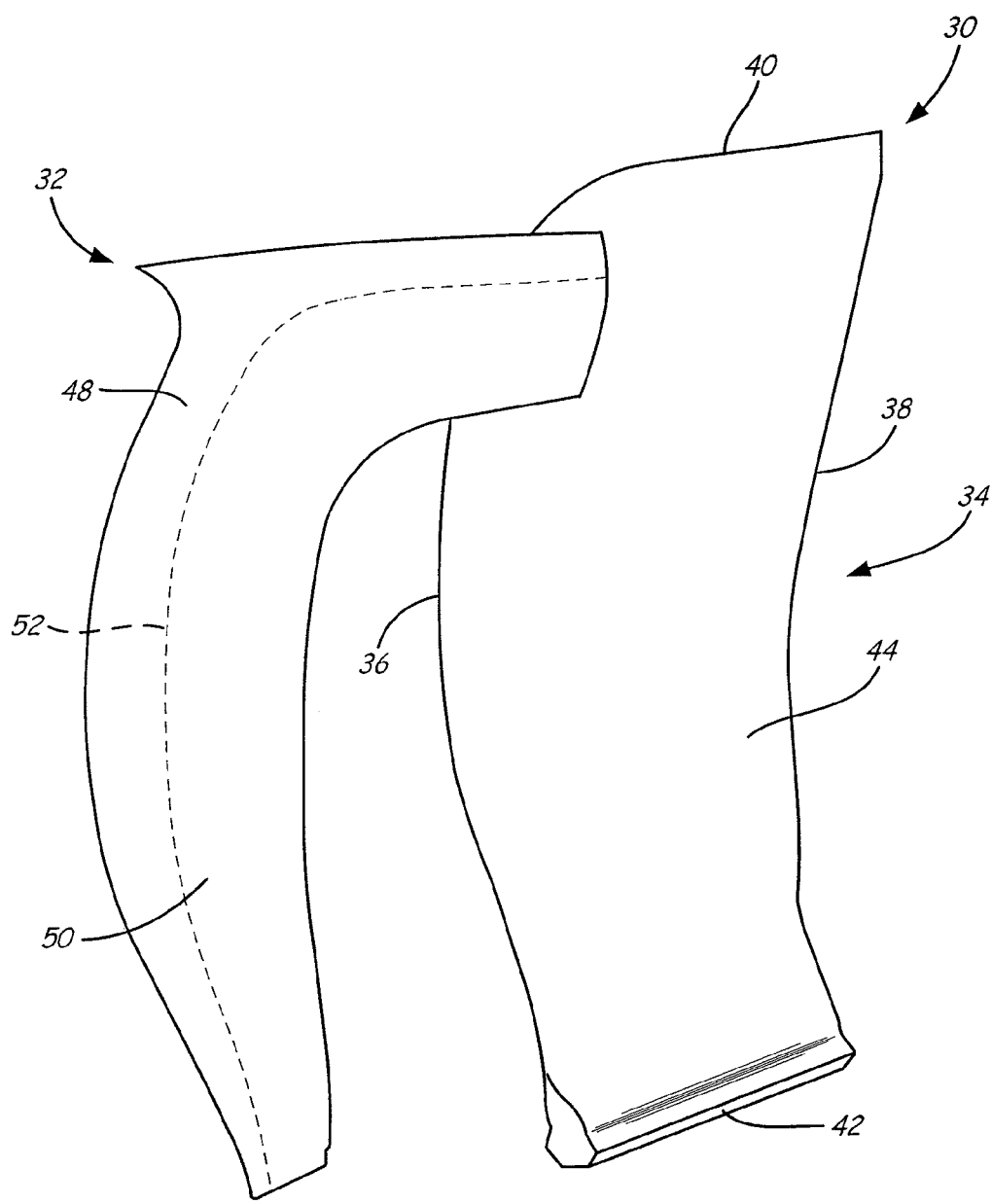
FIG. 3 is an exploded view of a blade with sheath according to the present invention.

FIG. 3 illustrates an exploded view of composite fan blade 30 and sheath 32 of the current invention. Composite fan blade 30 includes airfoil 34 with leading edge 36, trailing edge 38, tip 40, root 42, suction side 44 and pressure side 46 (not shown). Sheath 32 includes solid portion 48 and tapered flanks 50 (with line 52 inserted for illustration purposes only to show where solid portion 48 ends and tapered flanks 50 begin). Sheath 32 is attached to composite airfoil 34 by tapered flanks 50, one of which is bonded onto suction side 44, and one of which is bonded onto pressure side 46 of airfoil 34.

Solid section 48 of sheath 32 fully protects leading edge 36 and tip 40 of airfoil 34 by wrapping one solid portion 48 around airfoil 34 to cover all of leading edge 36 and tip 40. By wrapping one solid portion 48 around leading edge 36 and tip 40, sheath 32 provides extra strength for all areas of airfoil 34 where most delamination failures and/or cracking are initiated. The geometry of sheath 32 also adds significant stiffness to a blade made of more ductile materials (e.g., aluminum), where post impact permanent deformations are critical to run-on capability of the engine.

Sheath 32 may be formed as a single piece or may be formed from more than one piece (e.g., one piece to wrap around airfoil 34 leading edge 36 and a second piece to wrap around tip 40 of airfoil 34). If formed from more than one piece, pieces of sheath 32 can be secured together (by welding, bonding, etc.) into one piece before bonding sheath 32 onto airfoil 34. This single piece will ensure maximum strength of sheath 32 and therefore maximum protection for airfoil 34.

Sheath 32 is generally made of titanium or another material with similar strength to weight ratios and/or other characteristics which would make it ideal to use in protecting leading edge 36 and tip 40 of airfoil 34. While the present invention has been discussed mainly in relation to composite blades, it is understood that sheath 32 can be used to protect against delamination, deformation and cracking in any type of light weight blade (carbon fiber, aluminum, etc.). While the means of securing sheath 32 to blade 30 is discussed as tapered flanks 50, different means can be used to secure solid portion 48 of sheath 32 to airfoil 34.

In summary, sheath 32 includes a solid portion 48 to provide protection to tip 40 and leading edge 36 of blade 30, specifically protecting from the initiation of cracking or delamination failures; and tapered flanks 50 to provide additional stiffness to blade 30 and bond solid portion 48 onto blade 30. Sheath 32 allows blade 30 to be made of lightweight materials, and still maintain a thin cross-section (to maintain aerodynamic efficiency) as well as maintain the ability to resist cracking or delamination failures due to impact loading.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A sheath for a fan airfoil having a leading edge, a trailing edge, a tip, a root, a suction side and a pressure side, the sheath comprising:
   a one-piece sheath body that extends in a spanwise direction along the leading edge from the root to the tip to cover the leading edge and extends in a chordwise direction along the tip from the leading edge to the trailing edge to cover the tip; and
   means for securing the sheath body to the airfoil.

2. The sheath of claim 1, wherein the means for securing the sheath body to the airfoil comprises a first and a second flank attached to the sheath body.

3. The sheath of claim 2, wherein the first and the second flanks are each tapered.

4. The sheath of claim 2, wherein the first flank is secured to the suction side of the airfoil and the second flank is secured to the pressure side of the airfoil.

5. The sheath of claim 4, wherein the first and the second flanks are secured to the sides of the airfoil by bonding.

6. The sheath of claim 1, wherein the sheath is titanium.

7. A fan blade with a sheath, the fan blade comprising:
    a blade with a leading edge and a trailing edge in a chordwise direction, a tip and a root in a spanwise direction, and a suction side and a pressure side in a thickness direction; and
    a sheath with one solid portion that covers the leading edge and wraps around the leading edge to also cover the tip and first and second tapered flanks that secure the solid portion to the blade.

8. The fan blade of claim 7, wherein the first flank secures the solid portion to the blade suction side by bonding and the second flank secures the solid portion to the blade pressure side by bonding.

9. The fan blade of claim 7, wherein the solid portion of the sheath extends out from the leading edge at a length of about 5% to about 20% of the length of the blade in the chordwise direction.

10. The fan blade of claim 7, wherein the solid portion of the sheath extends out from the tip of the blade about 0.5 inches (12.7 mm).

11. The fan blade of claim 7, wherein the first and second flanks are about 2 inches (50.8 mm) to about 5 inches (127 mm) in length.

12. The fan blade of claim 7, wherein the sheath is titanium.

13. The fan blade of claim 7, wherein the blade is made of composite materials.

14. A method of fabricating a fan airfoil with a sheath, the method comprising:
    fabricating the airfoil with a leading edge, a trailing edge, a tip, a root, a suction side and a pressure side;
    forming a sheath with a one piece sheath body that extends in a spanwise direction along a leading edge from a root to a tip to cover the leading edge and extends in a chordwise direction along the tip from the leading edge to a trailing edge to cover the tip and a first flank and a second flank attached to the solid portion; and
    securing the sheath to the airfoil so that the sheath body covers the leading edge and tip of the airfoil.

15. The method of claim 14, wherein the step of fabricating the airfoil comprises:
    fabricating the airfoil with a composite material.

16. The method of claim 14, wherein the sheath is titanium.

17. The method of claim 14, wherein the step of forming the sheath comprises:
    forming the sheath body as a single piece.

18. The method of claim 14, wherein the step of forming the sheath comprises:
    forming the sheath body with a first piece configured to cover the airfoil leading edge; and
    forming the sheath body with a second piece configured to cover the airfoil tip.

19. The method of claim 18, wherein the step of forming the sheath further comprises:
    securing the first piece and second piece together before the step of securing the sheath to the airfoil.

20. The method of claim 14, wherein the step of securing the sheath to the airfoil comprises:
    bonding the first sheath flank to the airfoil suction side; and
    bonding the second sheath flank to the airfoil pressure side.

* * * * *